United States Patent
Tawada et al.

(10) Patent No.: US 11,385,660 B2
(45) Date of Patent: Jul. 12, 2022

(54) HOT WATER SUPPLY SYSTEM, SERVER AND NON-TRANSITORY COMPUTER READABLE RECORDING MEDIUM

(71) Applicant: NORITZ CORPORATION, Hyogo (JP)

(72) Inventors: Naoki Tawada, Hyogo (JP); Takahito Hashimoto, Hyogo (JP); Hiroshi Tosaki, Hyogo (JP); Masaharu Uchikura, Hyogo (JP)

(73) Assignee: NORITZ CORPORATION, Hyogo (JP)

( * ) Notice: Subject to any disclaimer, the term of this patent is extended or adjusted under 35 U.S.C. 154(b) by 461 days.

(21) Appl. No.: 16/578,409

(22) Filed: Sep. 23, 2019

(65) Prior Publication Data

US 2020/0103927 A1 Apr. 2, 2020

(30) Foreign Application Priority Data

Sep. 27, 2018 (JP) .............................. JP2018-182917

(51) Int. Cl.
*F24D 19/10* (2006.01)
*G05B 15/02* (2006.01)
(Continued)

(52) U.S. Cl.
CPC .............. *G05D 7/0676* (2013.01); *F24D 3/08* (2013.01); *F24D 17/0026* (2013.01);
(Continued)

(58) Field of Classification Search
CPC ..... G05D 7/0676; F24D 3/08; F24D 17/0026; F24D 19/1069; F24D 2220/042; F24D 19/1051; G05B 15/02
See application file for complete search history.

(56) References Cited

U.S. PATENT DOCUMENTS 9,386,140 B2 * 7/2016 Logan .................... H04W 4/80
9,749,792 B2 * 8/2017 Klicpera ................ F16K 31/02
(Continued)

FOREIGN PATENT DOCUMENTS

| CN | 102937801 | 2/2013 |
|---|---|---|
| JP | 2015082669 | 4/2015 |
| JP | 6142681 | 6/2017 |

OTHER PUBLICATIONS

Office Action of China Counterpart Application, with English translation thereof, dated May 17, 2022, pp. 1-26.

*Primary Examiner* — Ramesh B Patel
(74) *Attorney, Agent, or Firm* — JCIPRNET

(57) ABSTRACT

A hot water supply system includes a hot water supply device which can be connected to an external communication network via a communication repeater, and a server. The server obtains, in pairing processing of associating a mobile terminal device which can remotely control the hot water supply device with the hot water supply device, identification information of a communication repeater to which the mobile terminal device is connected, and stores the identification information along with pairing information. Besides, the server performs control to determine conditions of the remote control based on whether the identification information of the communication repeater stored in association with the hot water supply device being a remote operation destination matches identification information of the communication repeater received from the mobile terminal device in the communication, when the communication of the remote control is received from the mobile terminal device.

17 Claims, 9 Drawing Sheets

(51) Int. Cl.
*G05D 7/06* (2006.01)
*F24D 3/08* (2006.01)
*F24D 17/00* (2022.01)

(52) U.S. Cl.
CPC ......... *F24D 19/1069* (2013.01); *G05B 15/02* (2013.01); *F24D 2220/042* (2013.01)

(56) References Cited

U.S. PATENT DOCUMENTS

| | | | |
|---|---|---|---|
| 10,025,887 B1* | 7/2018 | Santarone | G01S 5/14 |
| 11,256,243 B2* | 2/2022 | Cella | H04L 1/0002 |
| 2014/0306833 A1* | 10/2014 | Ricci | B60R 25/00 |
| | | | 340/901 |
| 2018/0061158 A1* | 3/2018 | Greene | G06V 20/52 |
| 2018/0072972 A1* | 3/2018 | Shin | B67D 1/06 |
| 2020/0228969 A1* | 7/2020 | Shin | H04W 12/37 |

* cited by examiner

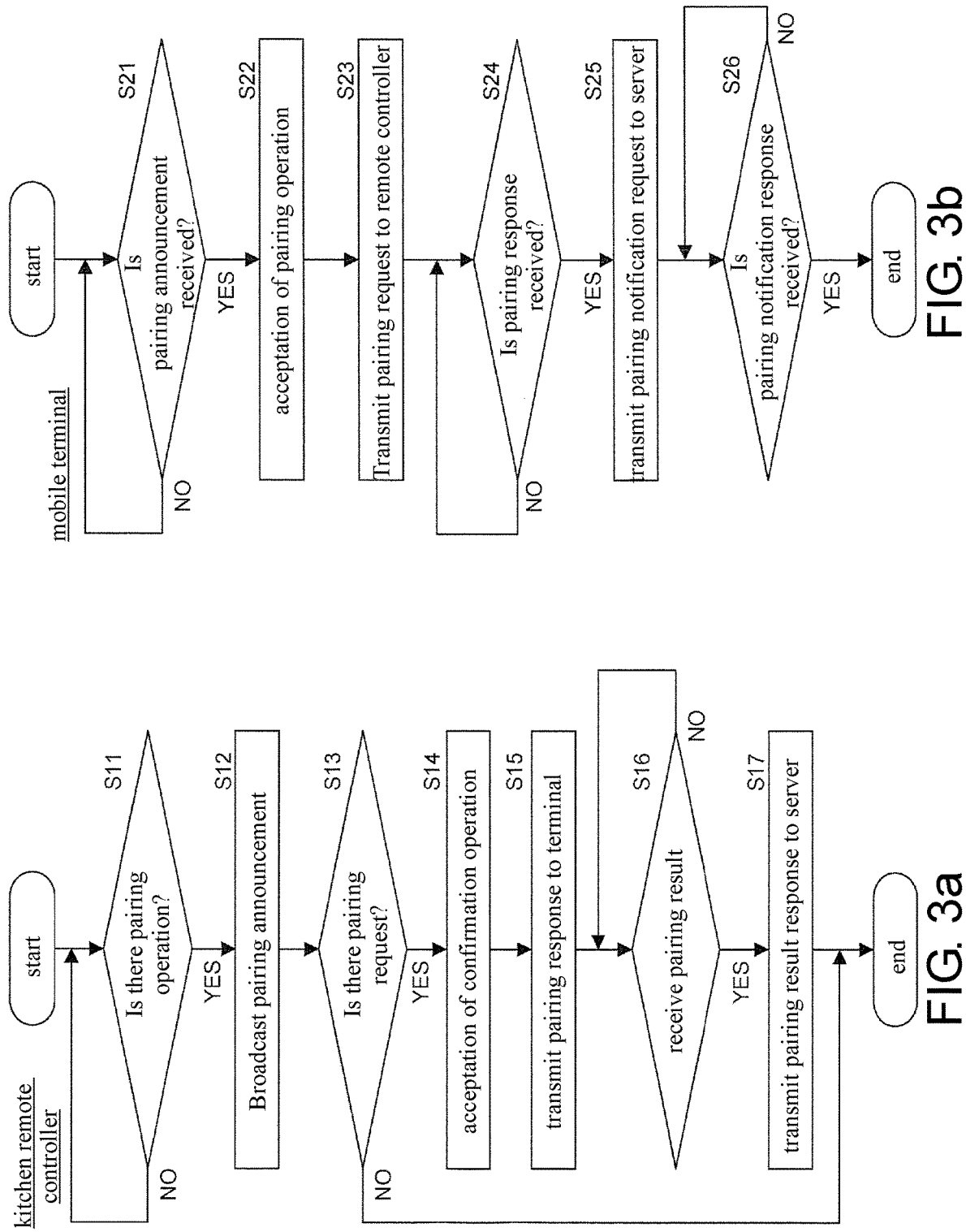

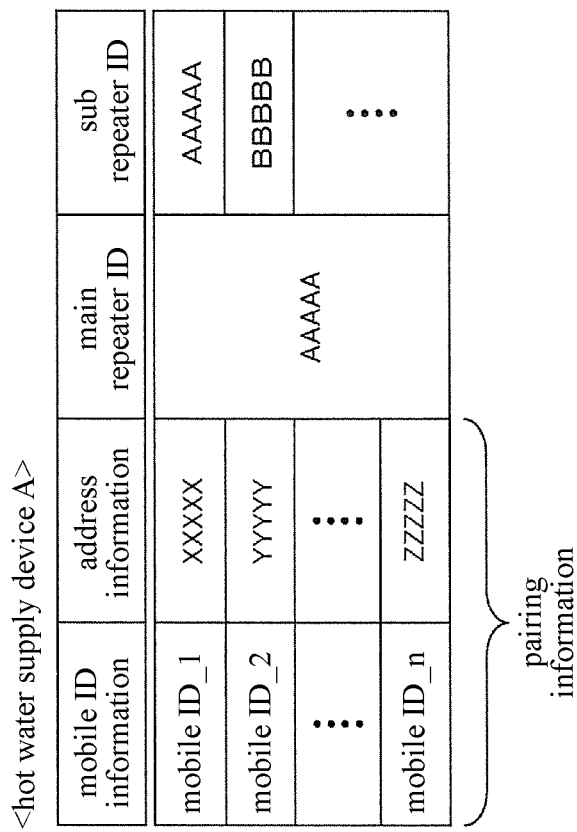
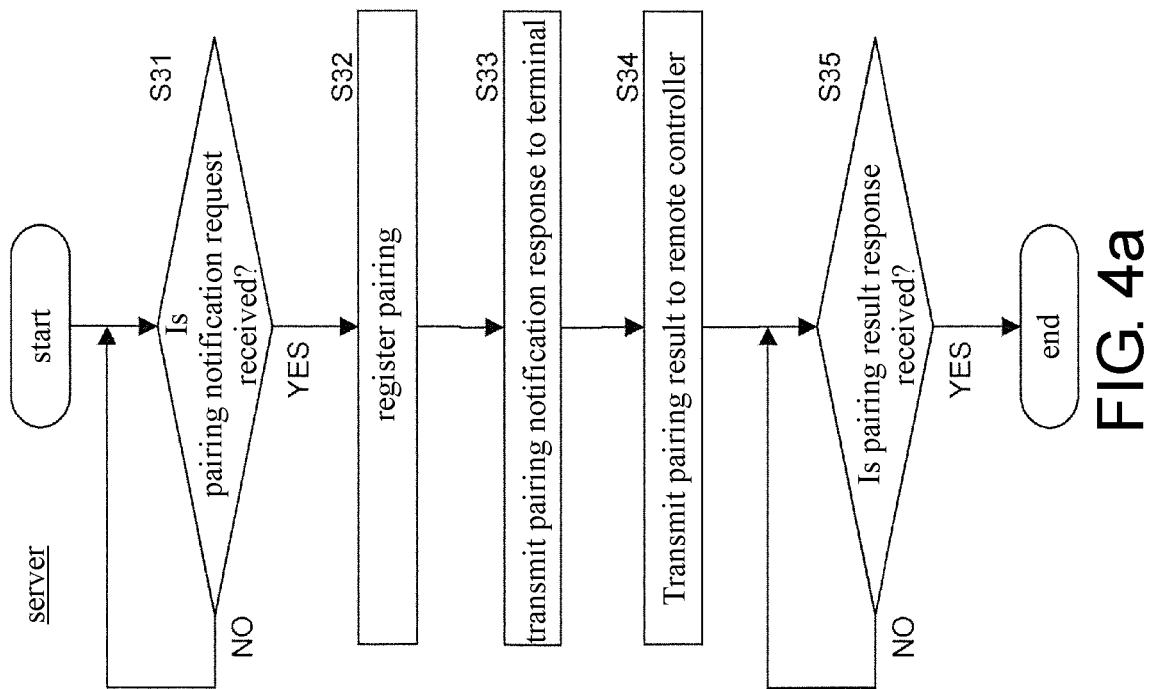
FIG. 4b
FIG. 4a

HOT WATER SUPPLY SYSTEM, SERVER AND NON-TRANSITORY COMPUTER READABLE RECORDING MEDIUM

CROSS-REFERENCE TO RELATED APPLICATION

This application claims the priority of Japan patent application serial no. 2018-182917, filed on Sep. 27, 2018. The entirety of the above-mentioned patent application is hereby incorporated by reference herein and made a part of this specification.

BACKGROUND

Technical Field

The disclosure relates to a hot water supply system which remotely controls, by a mobile terminal device, a hot water supply device which can be connected to an external communication network, a server which manages the remote control in the hot water supply system, and a non-transitory computer readable recording medium which makes a control portion of the mobile terminal device execute a function for remotely controlling the hot water supply device.

Related Art

Conventionally, in a hot water supply device, various settings are made by a remote controller installed in a bathroom, a living room, or a kitchen. With respect to this, recently, a system for remotely controlling a hot water supply device using a mobile terminal device such as a mobile phone or the like has been studied. For example, in patent literature 1 below, a system for remotely controlling a hot water supply heater using a mobile phone is disclosed.
[Patent literature 1] Japanese Laid-Open No. 6142681

The remote control for the hot water supply device can be executed when the mobile terminal device is either inside the house or outside the house. Here, when the hot water supply device is remotely controlled from outside the house, an operator performs settings for the hot water supply device without grasping usage status of the hot water supply device inside the house. In this case, for example, if a hot water supply temperature changes unexpectedly during hot water supply due to the remote control from outside the house, a noticeable discomfort or inconvenience is given to an actual user of the hot water supplied.

SUMMARY

The disclosure provides a hot water supply system, a server and a non-transitory computer readable recording medium capable of appropriately remotely controlling a hot water supply device from inside and outside the house using a mobile terminal device.

A first embodiment of the disclosure relates to a hot water supply system. The hot water supply system according to the embodiment includes a hot water supply device which can be connected to an external communication network via a communication repeater; and a server which is connected to the external communication network and controls the hot water supply device based on a request from a mobile terminal device. Here, the server obtains, in a pairing processing of associating the mobile terminal device which can remotely control the hot water supply device with the hot water supply device, identification information of the communication repeater to which the mobile terminal device is connected, stores the identification information in a storage portion along with pairing information, and performs control to determine conditions of the remote control based on whether the identification information of the communication repeater stored in the storage portion in association with the hot water supply device being a remote control destination matches identification information of a communication repeater received from the mobile terminal device in the communication, when the communication of the remote control to the hot water supply device is received from the mobile terminal device.

In the hot water supply system according to the embodiment, when identification information of the communication repeater different from each other is obtained in the pairing processing for a plurality of the mobile terminal devices, the server may store these identification information in the storage portion, and perform the control to determine the conditions of the remote control based on whether any identification information of the communication repeater stored in the storage portion in association with the hot water supply device being the remote control destination matches the identification information of the communication repeater received from the mobile terminal devices in the communication, when the communication of the remote control to the hot water supply device is received from the mobile terminal devices.

In the hot water supply system according to the embodiment, the server may perform the control for the mobile terminal device in a manner that there are more target items of remote operation when the two pieces of identification information being comparison targets match each other than target items of the remote operation when the two pieces of identification information do not match.

In the hot water supply system according to the embodiment, the identification information of the communication repeater may be, for example, a BSSID.

A second embodiment of the disclosure relates to a server which controls, based on a request from a mobile terminal device, a hot water supply device which is connected to an external communication network via a communication repeater. The server according to the embodiment includes a storage portion and a control portion. The control portion obtains, in a pairing processing of associating the mobile terminal device which can remotely control the hot water supply device with the hot water supply device, identification information of a communication repeater to which the mobile terminal device is connected, and stores the identification information in the storage portion along with pairing information, and performs control to determine conditions of the remote control based on whether the identification information of the communication repeater stored in the storage portion in association with the hot water supply device being a remote control destination matches identification information of a communication repeater received from the mobile terminal device in the communication, when the communication of the remote control to the hot water supply device is received from the mobile terminal device.

In the server according to the embodiment, the control portion stores, when identification information of the communication repeater different from each other is obtained in the pairing processing for a plurality of the mobile terminal devices, these identification information in the storage portion, and performs the control to determine the conditions of the remote control based on whether any identification information of the communication repeater stored in the storage portion in association with the hot water supply device being the remote control destination matches the identification information of the communication repeater received from the mobile terminal devices in the communication, when the communication of the remote control to the hot water supply device is received from the mobile terminal devices.

In addition, the control portion may perform the control for the mobile terminal device in a manner that there are more target items of a remote operation when the two pieces of identification information being comparison targets match each other than target items of the remote operation when the two pieces of identification information do not match.

In addition, the identification information of the communication repeater may be a BSSID.

A third embodiment of the disclosure relates to a non-transitory computer readable recording medium storing a program which makes a control portion of a mobile terminal device execute a function for remotely controlling a hot water supply device. The program includes, in a pairing processing of associating the mobile terminal device with the hot water supply device, processing of transmitting, via an external communication network to a server which manages the remote control, identification information of a communication repeater to which the mobile terminal device is connected.

The significance of the disclosure is more apparent by description of an embodiment below. However, the embodiment described below is merely an example when the disclosure is implemented, and the disclosure is not limited to what is described in the embodiment below.

BRIEF DESCRIPTION OF THE DRAWINGS

FIG. 3a and FIG. 3b are flowcharts respectively showing processing in a kitchen remote controller and a mobile terminal device for pairing the hot water supply device and the mobile terminal device according to the embodiment.

FIG. 4a is a flowchart showing processing in a server for pairing the hot water supply device and the mobile terminal device according to the embodiment. FIG. 4b is a diagram showing a configuration of information according to the embodiment which is managed in the server and in which the hot water supply device is associated with the mobile terminal device.

DESCRIPTION OF THE EMBODIMENTS

Figure 1:
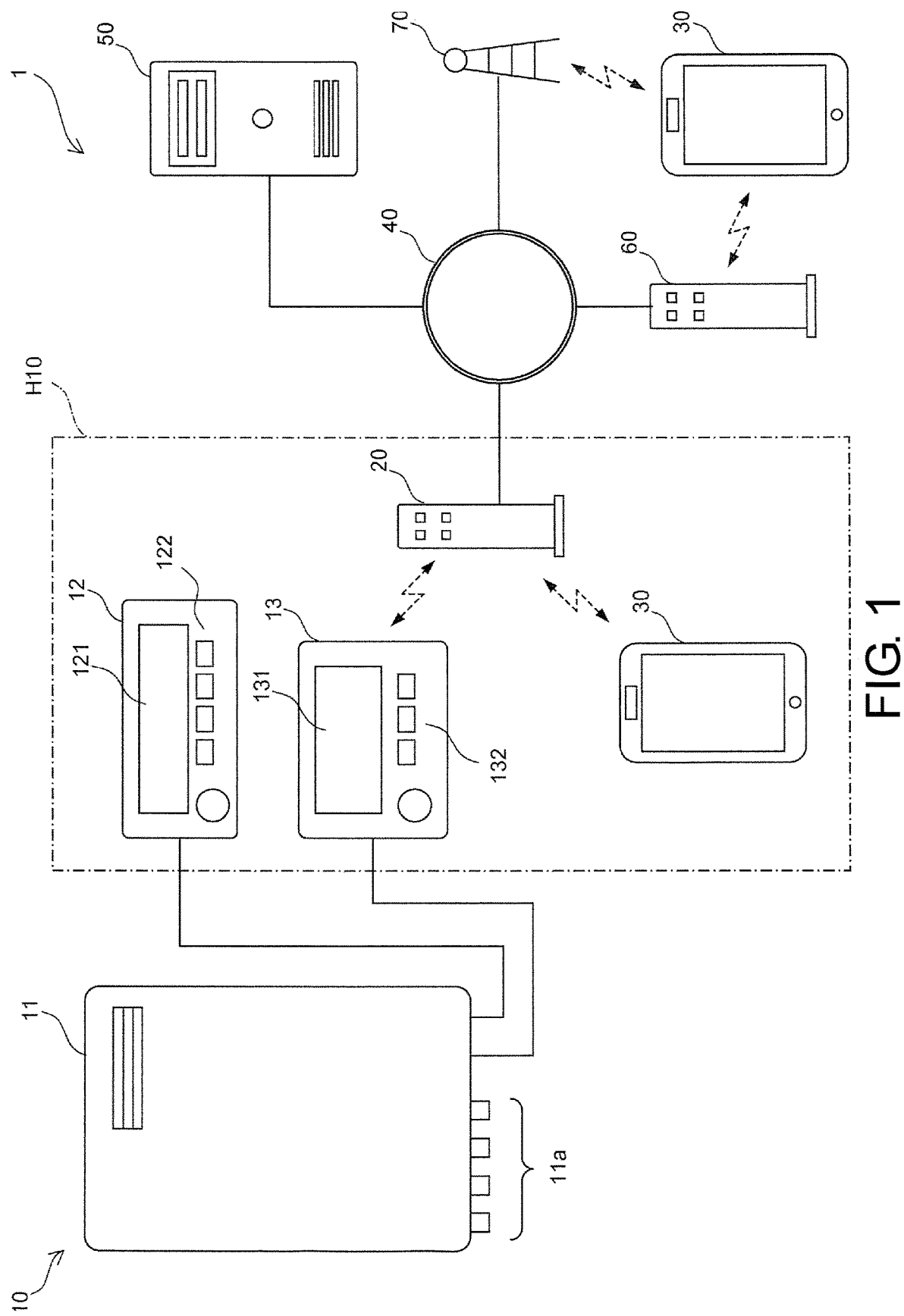
FIG. 1 is a diagram showing a configuration of a hot water supply system according to an embodiment.

According to the hot water supply system of the embodiment, when the pairing processing is performed inside the house, the identification information of the communication repeater inside the house to which the mobile terminal device is connected is stored in the storage portion of the server along with the pairing information. Therefore, when the communication of the remote control for the hot water supply device is received from the mobile terminal device, the server can determine whether the mobile terminal device is inside the house or outside the house, based on whether the identification information of the communication repeater received from the mobile terminal device in the communication matches the identification information of the communication repeater stored in the storage portion. Therefore, by performing the control to determine the conditions of the remote control in the server based on these two pieces of identification information, the hot water supply device can be appropriately remotely controlled from inside and outside the house.

According to this configuration, for example, even when the communication repeater to which the mobile terminal device is connected at the time of the pairing processing is different from the communication repeater to which the mobile terminal device is connected inside the house at the time of the remote control, if the identification information of the communication repeater which is connected at the time of the remote control is registered in the server by pairing processing of another mobile terminal device, the conditions of the remote control are set assuming that the mobile terminal device is inside the house. Therefore, the hot water supply device can be remotely controlled more appropriately from inside and outside the house.

In this way, the target items of the remote operation are limited at the time of the remote control from outside the house, and thereby a noticeable discomfort or inconvenience can be avoided from being given to a user in the house. Therefore, a more appropriate remote control can be achieved.

According to the server of the embodiment, the same effect as that of the first embodiment can be obtained.

According to the configurations, the same effects as the corresponding configurations shown in the first embodiment can be obtained.

According to the program of the embodiment, in the pairing processing, the identification information of the communication repeater to which the mobile terminal device is connected is transmitted from the mobile terminal device to the server. Therefore, in the server, the identification information of the communication repeater to which the mobile terminal device is connected at the time of the pairing processing can be smoothly obtained and managed.

As described above, according to the disclosure, the hot water supply system, the server and the non-transitory computer readable recording medium which can appropriately remotely control the hot water supply device from inside and outside the house using the mobile terminal device can be provided.

An embodiment of the disclosure is described below with reference to the drawings.

FIG. 1 is a diagram showing a configuration of a hot water supply system 1 according to the embodiment.

As shown in FIG. 1, the hot water supply system 1 includes a hot water supply device 10, a router 20, a mobile terminal device 30, an external communication network 40, and a server 50.

The hot water supply device 10 includes a water heater 11 and remote controllers 12 and 13. The water heater 11 is a gas water heater which uses gas as fuel to supply hot water. The hot water generated by the water heater 11 is supplied to kitchen faucets, bathtubs, and the like via pipes which are respectively connected to hot water supply ports 11a. When the water heater 11 has a floor heating function, a bathroom heating function, and a heating function using a panel heater, the hot water is supplied from the water heater 11 to devices which realize these functions.

The remote controllers 12 and 13 are connected to the water heater 11 and are used to perform various settings for each function of the hot water supply device 10. The remote controller 12 includes a display portion 121 and an input portion 122, and the remote controller 13 includes a display portion 131 and an input portion 132. An operator can make arbitrary settings for hot water filling, hot water supply temperature adjustment, and the like by operating the input portions 122 and 132 according to screens displayed on the display portions 121 and 131. The remote controller 12 is installed in a bathroom, and the remote controller 13 is installed in a kitchen or the like.

Hereinafter, the remote controller 12 installed in the bathroom is referred to as "the bathroom remote controller 12", and the remote controller 13 installed in the kitchen or the like is referred to as "the kitchen remote controller 13".

The router 20 is a wireless router for connecting each device existing inside a building (here, inside a house H10) to the server 50 via the external communication network 40. A unique BSSID (Basic Service Set Identifier) is assigned to the router 20 as an identifier which is individually assigned to each router. The router 20 can perform wireless communication in two types of frequency bands (2.4 GHz and 5 GHz). The BSSID is assigned for each frequency band to the router 20. The router 20 is a communication repeater for connecting a device inside the house H10 to the external communication network 40.

The kitchen remote controller 13 is connected to the router 20 by wireless communication. The kitchen remote controller 13 can be connected to the router 20 by only one (2.4 GHz) of the above two types of frequency bands (2.4 GHz and 5 GHz). In addition, when the mobile terminal device 30 exists inside the house H10, the mobile terminal device 30 is connected to the router 20 by wireless communication and can communicate with the server 50. The mobile terminal device 30 can be connected to the router 20 by any of the above two types of frequency bands (2.4 GHz and 5 GHz). The mobile terminal device 30 is, for example, a mobile phone. Additionally, the mobile terminal device 30 may be other portable terminal devices such as a mobile tablet terminal. The external communication network 40 is, for example, the Internet.

The server 50 for managing remote control (remote operation and remote monitoring) for the hot water supply device 10 is connected to the external communication network 40. The kitchen remote controller 13 communicates with the server 50 via the router 20 and the external communication network 40. When the mobile terminal device 30 exists inside the house H10, the mobile terminal device 30 communicates with the server 50 via the router 20 and the external communication network 40. In addition, when the mobile terminal device 30 is outside the house, the mobile terminal device 30 is connected to the external communication network 40 via a router 60 or a base station 70 installed outside and communicates with the server 50.

An application program of the hot water supply system 1 is downloaded from the server 50 and installed in the kitchen remote controller 13 and the mobile terminal device 30. This application program includes address information (IP address) for accessing the server 50. Based on this address information, the kitchen remote controller 13 and the mobile terminal device 30 access the server 50 and communicate with the server 50.

The address information of the kitchen remote controller 13 is transmitted to and kept in the server 50 at the time of initial setting. At the same time, ID information (a BSSID) of the router 20 to which the kitchen remote controller 13 is connected is transmitted from the kitchen remote controller 13 to the server 50. The ID information (the BSSID) of the router 20 is transferred from the router 20 to the kitchen remote controller 13 when the kitchen remote controller 13 and the router 20 are connected, and is kept in the kitchen remote controller 13. In addition, the address information of the mobile terminal device 30 is transmitted from the mobile terminal device 30 to the server 50 and kept in the server 50 during pairing processing described later.

In the embodiment, MAC (Media Access Control) addresses kept in a wireless communication portion 136 of the kitchen remote controller 13 and a wireless communication portion 305 of the mobile terminal device 30 (see FIG. 2) which are described later is used as the address information of the kitchen remote controller 13 and the mobile terminal device 30. The address information of the kitchen remote controller 13 and the mobile terminal device 30 may be global IP addresses of the wireless communication portion 136 of the kitchen remote controller 13 and the wireless communication portion 305 of the mobile terminal device 30.

In the configuration of FIG. 1, the operator can perform the remote control (the remote operation and the remote monitoring) for the hot water supply device 10 using the mobile terminal device 30 both inside the house H10 and outside the house.

That is, regardless of whether the mobile terminal device 30 is inside the house H10 or outside the house, a setting request input from the operator to the mobile terminal device 30 is temporarily transmitted to the server 50 via the external communication network 40. In response to this, the server 50 transmits the received setting request to the hot water supply device 10 associated in advance with the mobile terminal device 30 which has received the setting request. Thereby, the setting request is transmitted to the kitchen remote controller 13 of the corresponding hot water supply device 10 via the external communication network 40 and the router 20. Thus, setting of a content requested by the operator is applied to the hot water supply device 10 by the remote control.

In addition, state information of the hot water supply device 10 is transmitted from the kitchen remote controller 13 to the server 50 via the router 20 at any time in a predetermined cycle. The state information is information indicating a current setting state of the hot water supply device 10. The server 50 manages the received state information for each hot water supply device 10. A browsing request of the remote monitoring input from the operator to the mobile terminal device 30 is temporarily transmitted to the server 50 via the external communication network 40. In response to this, the server 50 transmits, to the mobile terminal device 30 which has received the browsing request, the state information of the hot water supply device 10 specified by the browsing request of the hot water supply device 10 associated in advance with the mobile terminal device 30. Thereby, the state of the hot water supply device 10 is output in the mobile terminal device 30. Thus, the operator can check the state of the hot water supply device 10 both inside and outside the house.

Figure 2:
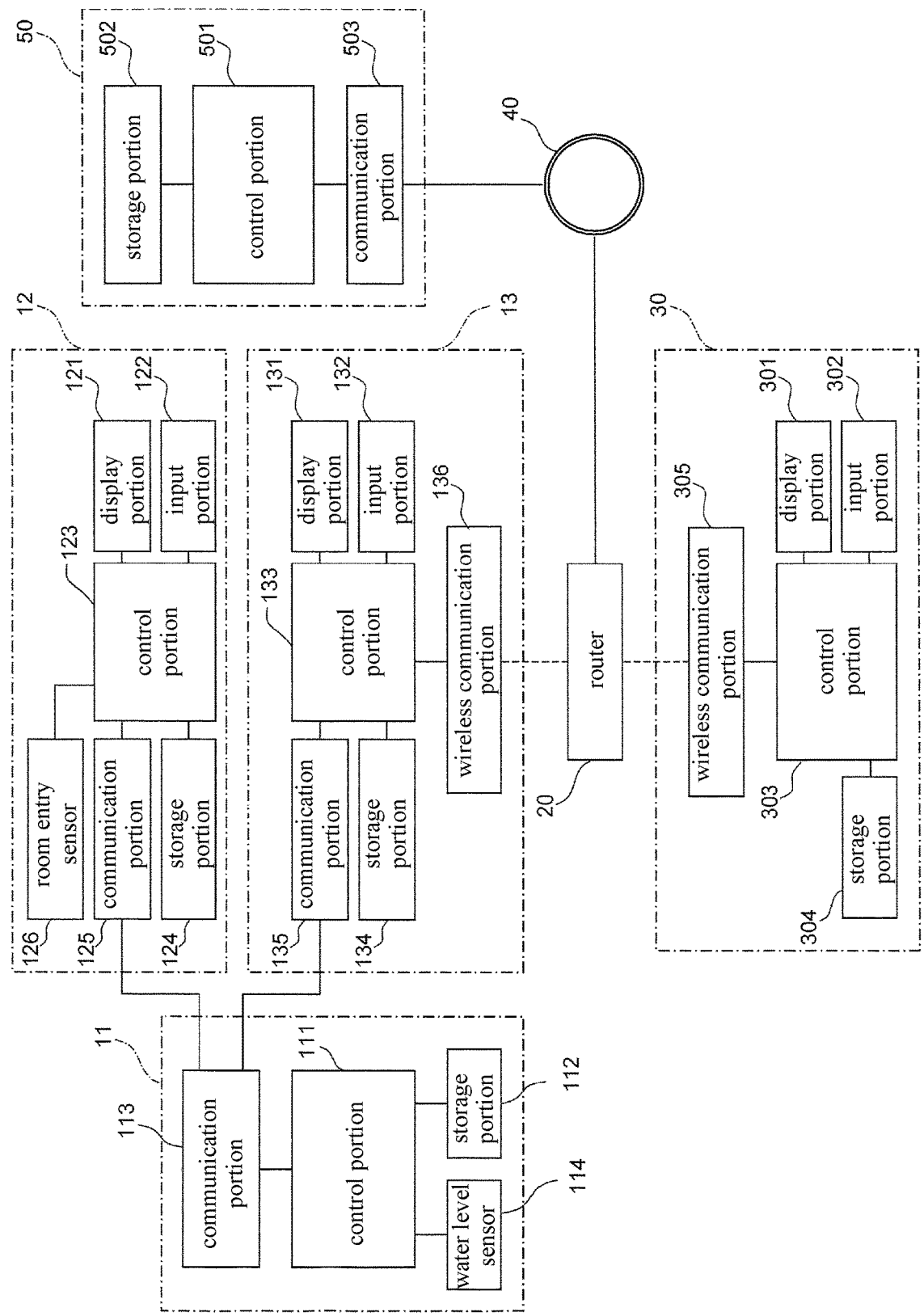
FIG. 2 is a diagram showing a circuit block of each device configuring the hot water supply system according to the embodiment.

FIG. 2 is a diagram showing a circuit block of each device configuring the hot water supply system 1.

The water heater 11 includes a control portion 111, a storage portion 112, a communication portion 113, and a water level sensor 114. The control portion 111 includes a CPU (Central Processing Unit) and controls each portion inside the water heater 11 according to a program stored in the storage portion 112. The storage portion 112 includes a memory and stores a predetermined control program. The communication portion 113 communicates with the bathroom remote controller 12 and the kitchen remote controller 13 according to the control from the control portion 111.

The water level sensor 114 detects a water level of the bathtub to which the hot water supply device 10 is connected. The water level sensor 114 detects, for example, the water level of the bathtub based on a water pressure in a pipe connected to the bathtub. The control portion 111 detects that a person is bathed in and out of the bathtub based on a change of the water level detected by the water level sensor 114.

The bathroom remote controller 12 includes, in addition to the display portion 121 and the input portion 122 described above, a control portion 123, a storage portion 124, a communication portion 125, and a room entry sensor 126. The display portion 121 is configured, for example, by a liquid crystal panel. The input portion 122 includes various operation buttons such as a temperature setting button and the like. The display portion 121 may be a touch panel.

The control portion 123 includes a CPU and performs a predetermined control according to a program stored in the storage portion 124. The storage portion 124 includes a memory and stores a predetermined control program. The communication portion 125 communicates with the water heater 11 according to the control from the control portion 123. The room entry sensor 126 detects entry and exit of a person to the bathroom. The room entry sensor 126 is, for example, a human sensor using infrared rays. The control portion 123 detects that a person has entered the bathroom based on output of the room entry sensor 126.

The kitchen remote controller 13 includes, in addition to the display portion 131 and the input portion 132 described above, a control portion 133, a storage portion 134, and a communication portion 135. The display portion 131 is configured, for example, by a liquid crystal panel. The input portion 132 includes various operation buttons. The display portion 131 may be a touch panel. The control portion 133 includes a CPU and performs a predetermined control according to a program stored in the storage portion 134. The storage portion 134 includes a memory and stores a predetermined control program. The communication portion 135 communicates with the water heater 11 according to the control from the control portion 133.

Furthermore, the kitchen remote controller 13 includes the wireless communication portion 136. Here, the wireless communication portion 136 is a wireless communication module capable of wireless communication with the router 20. An IP address for specifying a device on a LAN (Local Area Network) set inside the house H10 is assigned to the wireless communication portion 136 (the wireless communication module). In addition, the wireless communication portion 136 keeps the MAC address described above. The wireless communication portion 136 also keeps the BSSID. Additionally, the kitchen remote controller 13 includes a speaker for outputting sound.

The mobile terminal device 30 includes a display portion 301, an input portion 302, a control portion 303, a storage portion 304, and a wireless communication portion 305. The display portion 301 is configured, for example, by a liquid crystal panel. The input portion 302 includes various operation buttons and a touch panel stacked on the display portion 301.

The control portion 303 includes a CPU and performs a predetermined control according to a program stored in the storage portion 304. The storage portion 304 includes a memory and stores a predetermined control program. The wireless communication portion 305 communicates with the router 20 according to the control from the control portion 303. The wireless communication portion 305 is a wireless communication module capable of wireless communication with the router 20. The IP address is also assigned to the wireless communication portion 305. In addition, the wireless communication portion 305 keeps the above-described MAC address. The wireless communication portion 305 also keeps the BSSID. Additionally, the mobile terminal device 30 includes a speaker for outputting sound.

The server 50 includes a control portion 501, a storage portion 502, and a communication portion 503. The control portion 501 includes a CPU and performs a predetermined control according to a program stored in the storage portion 502. The storage portion 502 includes a memory and a hard disk and stores a predetermined control program and a database. The communication portion 503 performs a predetermined control according to the control from the control portion 501.

In the embodiment, the mobile terminal device 30 capable of performing the remote control (the remote operation and the remote monitoring) on the hot water supply device 10 is registered in advance in the server 50 in association with the hot water supply device 10. That is, the hot water supply device 10 and the mobile terminal device 30 are paired in advance, and information indicating the pairing (pairing information) is managed in the server 50.

In the embodiment, this pairing is performed in the building where the hot water supply device 10 is installed. That is, the owner of the mobile terminal device 30 cannot, in principle, pair his/her own mobile terminal device 30 and the hot water supply device 10 unless he/she enters, taking the mobile terminal device 30, the building where the hot water supply device 10 is installed. Thereby, a possibility that the mobile terminal device 30 and the hot water supply device 10 are unjustly paired by a malicious third party is reduced. Therefore, a risk that the remote control (the remote control and the remote monitoring) is unjustly performed can be suppressed.

FIG. 3a and FIG. 3b are flowcharts respectively showing processing in the kitchen remote controller 13 and the mobile terminal device 30 for pairing the hot water supply device 10 and the mobile terminal device 30.

The operator activates the application program of the hot water supply system 1 installed in the mobile terminal device 30 inside the house H10 and sets the mobile terminal device 30 to a pairing mode. Thereafter, the operator performs an operation for pairing on the input portion 132 of the kitchen remote controller 13.

With reference to FIG. 3a, if the operation for pairing is performed on the kitchen remote controller 13 (S11: YES), the controller 133 of the kitchen remote controller 13 broadcast-transmits an announcement for the pairing using the UDP protocol (S12). The broadcast transmission is performed multiple times (for example, three times). When the mobile terminal device 30 is inside the house H10, this announcement is received by the mobile terminal device 30.

With reference to FIG. 3b, if the control portion 303 of the mobile terminal device 30 receives the announcement (S21: YES), an acceptation screen for accepting the pairing operation is displayed on the display portion 301 (S22). The operator performs the operation for the pairing on the acceptation screen. For example, the acceptation screen includes a button for confirming the pairing. The operator touches this button to confirm the pairing. Thereby, As a result, the control portion 303 unicast-transmits a pairing request to the kitchen remote controller 13 using the TCP protocol (S23). The pairing request includes the ID information and the address information (the MAC address) of the mobile terminal device 30. As the ID information of the mobile terminal device 30, for example, a UUID (Universally Unique Identifier) or a GUID (Globally Unique Identifier) of the wireless communication portion 305 is used.

With reference to FIG. 3a, if no pairing request is received within a predetermined time (S13: NO), the control portion 133 of the kitchen remote controller 13 ends the pairing processing. On the other hand, if the pairing request is received from the mobile terminal device 30 within a predetermined time from the transmission of the announcement (S13: YES), the control portion 133 displays an acceptation screen for accepting pairing confirmation on the display portion 131 (S14).

The operator performs an operation for confirming the pairing on the acceptation screen. Thereby, the control portion 133 transmits a pairing response to the mobile terminal device 30 by the TCP protocol (S15). This pairing response includes the ID information of the kitchen remote controller 13. As the ID information of the kitchen remote controller 13, for example, THING of the wireless communication portion 136 is used. Furthermore, the pairing response includes the ID information (BSSID) of the router 20 to which the kitchen remote controller 13 is connected.

With reference to FIG. 3b, if the pairing response is received from the kitchen remote controller 13 (S24: YES), the control portion 303 of the mobile terminal device 30 transmits a pairing notification request to the server 50 (S25). Here, since the mobile terminal device 30 is inside the house H10, the pairing notification request is transmitted via the router 20.

The above pairing notification request includes the ID information (UUID/GUID) and the address information (MAC address) of the mobile terminal device 30 and the ID information (BSSID) of the router 20 to which the mobile terminal device 30 is connected. The ID information (BSSID) of the router 20 to which the mobile terminal device 30 is connected is transferred from the router 20 to the mobile terminal device 30 and kept in the mobile terminal device 30 when the mobile terminal device 30 and the router 20 are connected. The ID information (BSSID) included in the pairing request notification is the BSSID corresponding to the frequency band used for the connection of the mobile terminal device 30 during the pairing processing in the two BSSIDs corresponding to the above two types of frequency bands (2.4 GHz and 5 GHz). Furthermore, the pairing notification request includes the ID information (THING) of the kitchen remote controller 13 included in the pairing response and the ID information (BSSID) of the router 20 to which the kitchen remote controller 13 is connected.

Furthermore, when the MAC address is used as the ID information of the mobile terminal device 30, the pairing notification request does not include the address information of the mobile terminal device 30. In this case, the ID information (MAC address) of the mobile terminal device 30 is also used as the address information of the mobile terminal device 30.

Thereafter, the control portion 303 of the mobile terminal device 30 waits to receive a response to the pairing notification request (a pairing notification response) from the server 50 (S26). As will be described later, when the hot water supply device 10 (here, the kitchen remote controller 13) and the mobile terminal device 30 are associated with each other in the server 50 based on the pairing notification request, the pairing notification response (a pairing result) is transmitted from the server 50 to the control portion 303 of the mobile terminal device 30 via the router 20. In this way, if the pairing notification response is received (S26: YES), the control portion 303 of the mobile terminal device 30 ends the processing on the assumption that the pairing has been properly registered in the server 50.

With reference to FIG. 3a, after transmitting the pairing response to the mobile terminal device 30 in step S15, the control portion 133 of the kitchen remote controller 13 waits to receive the pairing result notification from the server 50 (S16). As will be described later, when the hot water supply device 10 (here, the kitchen remote controller 13) and the mobile terminal device 30 are associated with each other, the server 50 transmits the pairing result notification to the kitchen remote controller 13. In this way, if the pairing result notification is received (S16: YES), the control portion 133 of the kitchen remote controller 13 checks that the pairing has been properly registered in the server 50 based on the received pairing result, and transmits the pairing result response to the server 50 (S17). Thereby, the processing in the kitchen remote controller 13 is ended.

FIG. 4a is a flowchart showing the processing in the server 50 for pairing the hot water supply device 10 (the kitchen remote controller 13) and the mobile terminal device 30.

If the control portion 501 of the server 50 receives the pairing notification request transmitted from the mobile terminal device 30 in step S25 of FIG. 3b (S31: YES), based on the received pairing notification request, the pairing of the hot water supply device 10 and the mobile terminal device 30 is registered in the database kept in the storage portion 502 (S32).

Specifically, the control portion 501 extracts the ID information and the address information of the mobile terminal device 30 and the ID information of the hot water supply device 10 (here, the kitchen remote controller 13) from the received pairing notification request. Then, the control portion 501 stores the extracted ID information of the hot water supply device 10 (the kitchen remote controller 13) and the ID information and the address information of the mobile terminal device 30 in association with each other in the storage portion 502.

FIG. 4b is a diagram showing a configuration of the pairing information which is managed in the server 50 and in which the hot water supply device 10 (here, the kitchen remote controller 13) is associated with the mobile terminal device 30.

As shown in FIG. 4b, in the server 50, for each hot water supply device 10, the ID information of the mobile terminal device 30 paired with the hot water supply device 10 and the address information of each mobile terminal device 30 are managed. Specifically, a database used for controlling the hot water supply system 1 is constructed in the storage portion 502 of the server 50, and the information in FIG. 4*b* is managed for each hot water supply device 10 in this database. Furthermore, as described above, when the ID information of the mobile terminal device 30 is the MAC address, the ID information is also used as the address information, and thus the address information is omitted from the configuration in FIG. 4*b*.

As shown in FIG. 4*b*, in the database of the server 50, ID information (a main repeater ID) of a communication repeater (the router 20) to which the hot water supply device 10 (the kitchen remote controller 13) is connected is registered for each hot water supply device 10 together with the pairing information. Here, the BSSID of the communication repeater (the router 20) is kept as the main repeater ID. As described above, the BSSID registered as the main repeater ID is transmitted from the kitchen remote controller 13 to the server 50 together with the ID information of the kitchen remote controller 13 at the time of the initial setting, and is registered in the database of the server 50.

Furthermore, in the database of the server 50, ID information (a sub repeater ID) of the communication repeater (the router 20) to which the mobile terminal device 30 is connected during the pairing processing is registered for each hot water supply device 10 together with the pairing information. Here, the BSSID of the communication repeater (the router 20) is kept as the sub repeater ID. In step S25 of FIG. 3*b*, the BSSID registered as the sub repeater ID is included in the pairing notification request, transmitted from the mobile terminal device 30 to the server 50, and registered in the database of the server 50.

The pairing notification request transmitted at this time includes, as described above, the BSSID of the communication repeater (the router 20) to which the kitchen remote controller 13 is connected. When the sub repeater ID is registered, the server 50 checks that this BSSID matches the main repeater ID registered in the database.

Furthermore, as shown in FIG. 4*b*, a plurality of the sub repeater IDs can be registered for one hot water supply device 10 in the database. During the pairing processing, the mobile terminal device 30 can be connected to the router 20 in either the 2.4 GHz frequency band or the 5 GHz frequency band. Therefore, when a plurality of the mobile terminal devices 30 are paired with the hot water supply device 10, BSSIDs corresponding to the 2.4 GHz frequency band and BSSIDs corresponding to the 5 GHz frequency band may be transmitted to the server 50 by the pairing notification request. In addition, if other routers or repeaters for amplifying radio waves are further installed inside the house H10, it may be assumed that the mobile terminal devices 30 are connected to these other routers or repeaters during the pairing processing. In this case, a different BSSID may be further transmitted to the server 50 by the pairing notification request during the pairing processing.

In this way, since different types of BSSIDs may be registered as sub repeater IDs, a plurality of the sub repeater IDs can be registered for one hot water supply device 10 in the database. Furthermore, the sub BSSIDs registered for one hot water supply device 10 are adjusted so that the same sub BSSID is not repeated. That is, when the BSSID of the communication repeater (the router 20) to which the mobile terminal device 30 is connected; that is, the BSSID included in the pairing notification request and transmitted during the pairing processing is already registered as a sub repeater ID in association with the hot water supply device 10 being a pairing destination, the server 50 performs the processing in a manner that this BSSID is not repeatedly registered as a sub repeater ID.

Returning to FIG. 4*a*, the control portion 501 of the server 50 transmits the pairing notification response to the mobile terminal device 30 when the registration of the pairing is performed in step S32 (S33). The transmitted pairing notification response is received by the mobile terminal device 30 in step S26 of FIG. 3*b*.

Furthermore, the control portion 501 of the server 50 transmits the pairing result notification indicating that the pairing has been performed to the hot water supply device 10 (here, the kitchen remote controller 13) which is a target of the pairing (S34). The transmitted pairing result is received by the kitchen remote controller 13 in step S16 of FIG. 3*a*.

Thereafter, the control portion 501 of the server 50 waits to receive the pairing result response from the hot water supply device 10 (the kitchen remote controller 13) (S35). The pairing result response is transmitted from the kitchen remote controller 13 in step S17 of FIG. 3*a*. On receiving the pairing result response from the kitchen remote controller 13 (S35: YES), the control portion 501 of the server 50 ends the pairing processing.

Figure 5:
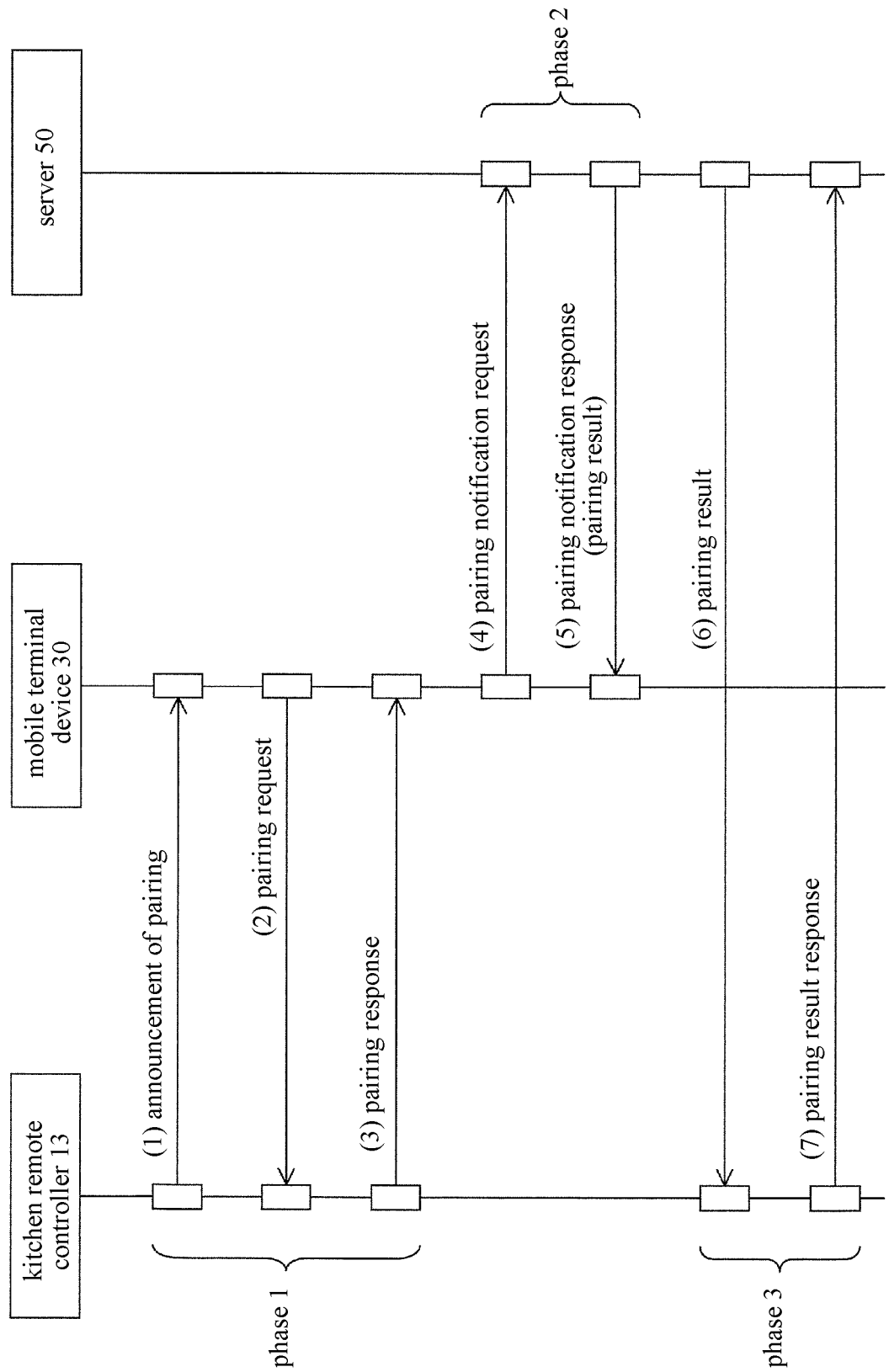
FIG. 5 is a sequence diagram showing a flow of information transmission/reception according to the embodiment which is performed between devices when pairing the hot water supply device and the mobile terminal device.

FIG. 5 is a sequence diagram showing a flow of information transmission/reception performed between the kitchen remote controller 13, the mobile terminal device 30, and the server 50 when the hot water supply device 10 and the mobile terminal device 30 are paired. This sequence is performed according to the flowcharts shown in FIGS. 3*a*-4*a*.

If the operation for pairing is performed on the kitchen remote controller 13, an announcement for pairing is transmitted from the kitchen remote controller 13 by broadcast in sequence (1). If this announcement is accepted in the mobile terminal device 30, a pairing request is transmitted from the mobile terminal device 30 to the kitchen remote controller 13 in sequence (2). If this pairing request is accepted in the kitchen remote controller 13, a pairing response is transmitted from the kitchen remote controller 13 to the mobile terminal device 30 in sequence (3). At this time, as described above, the ID information (UUID/GUID) of the kitchen remote controller 13 and the ID information (BSSID) of the router 20 (communication repeater) to which the kitchen remote controller 13 is connected are transferred from the kitchen remote controller 13 to the mobile terminal device 30. In this way, a procedure for the pairing performed between the kitchen remote controller 13 and the mobile terminal device 30 is ended (phase 1).

Next, in sequence (4), a pairing notification request for requesting pairing registration is transmitted from the mobile terminal device 30 to the server 50. The pairing notification request includes the ID information (UUID/GUID) of the kitchen remote controller 13 and the ID information (BSSID) of the router 20 (the communication repeater) to which the kitchen remote controller 13 is connected, the ID information and the address information of the mobile terminal device 30 and the ID information (BSSID) of the router 20 (the communication repeater) to which the mobile terminal device 30 is connected.

If the pairing notification request is received by the server 50, as described above, the association (the pairing) of the hot water supply device 10 which is specified by the ID information of the kitchen remote controller 13 and the mobile terminal device 30 is registered in the database in the server 50. At the same time, when the ID information of the router 20 (the communication repeater) to which the mobile terminal device 30 is connected is not included in the sub repeater ID, the ID information is registered as the sub repeater ID. In this registration, it is checked that the ID information of the router 20 to which the kitchen remote controller 13 is connected in the pairing notification request matches the main repeater ID.

When all the registrations are ended in this way, a pairing notification response (a pairing result) is transmitted from the server 50 to the mobile terminal device 30 in sequence (5). Thereby, it is checked that the pairing is appropriately performed in the mobile terminal device 30. In this way, the procedure performed between the server 50 and the mobile terminal device 30 is ended (phase 2).

Furthermore, in sequence (6), a pairing result notification indicating that the pairing has been registered is transmitted from the server 50 to the kitchen remote controller 13. If this notification is received in the kitchen remote controller 13, as described above, it is checked that the pairing is appropriately performed in the kitchen remote controller 13 based on the pairing result, and the pairing result response is transmitted from the remote controller 13 to the server 50 in sequence (7). Thereby, the procedure performed between the server 50 and the kitchen remote controller 13 is ended (phase 3). In this way, all sequences for the pairing are ended.

As described above, the pairing information is registered in the server 50, and thereby the mobile terminal device 30 which can remotely control the hot water supply device 10 is limited to the mobile terminal device 30 for which the ID information is included in the pairing information. Thereby, security of the user of the hot water supply device 10 is ensured.

Next, the control at the time of remote operation in the hot water supply system 1 is described.

Figure 6B:
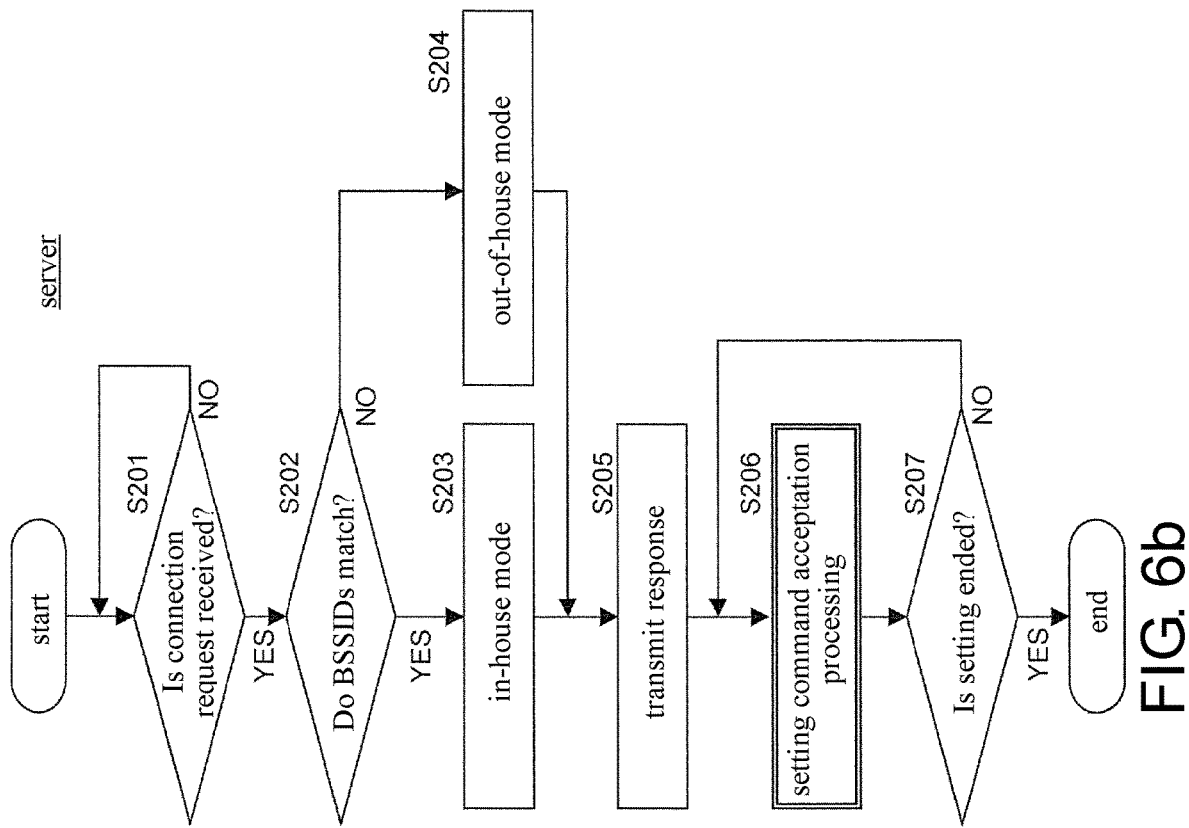
FIG. 6a and FIG. 6b are flowcharts respectively showing control of the mobile terminal device and the server in remote operation according to the embodiment.
Figure 6A:
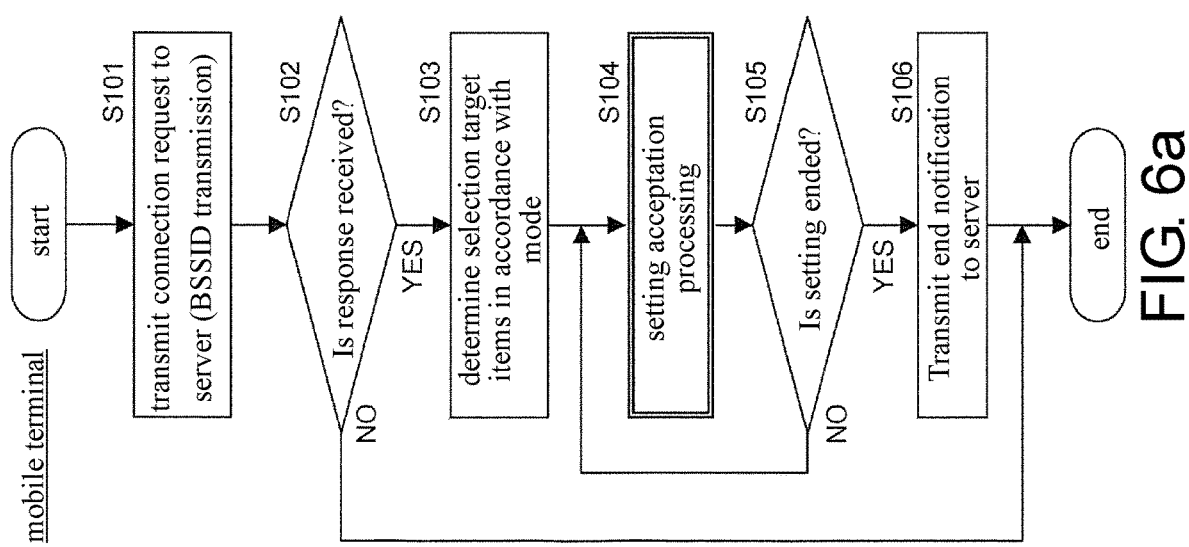

FIG. 6a and FIG. 6b are flowcharts respectively showing control of the mobile terminal device 30 and the server 50 in the remote operation.

With reference to FIG. 6a, when the operator starts an application for remote operation on the mobile terminal device 30, the control portion 303 of the mobile terminal device 30 transmits a connection request to the server 50. The connection request includes identification information (mobile ID) of the mobile terminal device 30 and identification information (BSSID) of the router (the communication repeater) to which the mobile terminal device 30 is connected (S101).

With reference to FIG. 6b, on receiving the connection request from the mobile terminal device 30 (S201: YES), the control portion 501 of the server 50 extracts the identification information (the mobile ID) of the mobile terminal device 30 from the connection request, and specifies management information (see FIG. 4b) of the hot water supply device 10 that corresponds to the extracted identification information (the mobile ID). Then, the control portion 501 determines whether a sub repeater ID (BSSID) included in the management information matches the identification information (BSSID) of a router being a connection destination received together with the connection request (S202).

Here, when the mobile terminal device 30 is inside the house H10, the mobile terminal device 30 is connected to the router 20 inside the house H10 and transmits the connection request to the server 50. Therefore, in this case, the identification information (BSSID) of the router 20 installed inside the house H10 is transmitted together with the connection request. Thus, the identification information (BSSID) of the router received by the server 50 together with the connection request matches the sub repeater ID (BSSID) included in the management information. Thereby, the determination of step S202 is YES.

In contrast, when the mobile terminal device 30 is outside the house, the mobile terminal device 30 is connected to the router 60 (a communication repeater) different from the router 20 inside the house H10 and transmits the connection request to the server 50. Therefore, in this case, identification information (BSSID) different from the router 20 inside the house H10 is transmitted to the server 50 together with the connection request. Thus, the identification information (BSSID) of the router received by the server 50 together with the connection request does not match the sub repeater ID (BSSID) included in the management information. Thereby, the determination of step S202 is NO.

Furthermore, as described above, since the router 20 can communicate in two types of frequency bands (2.4 GHz and 5 GHz), when remote control is performed inside the house H10, the mobile terminal device 30 may be connected to the router 20 in a frequency band different from the frequency band during the pairing. In addition, when a router or a repeater different from the router 20 is installed inside the house H10, the mobile terminal device 30 may also be connected to a communication repeater different from the communication repeater used during the pairing. In these cases, the identification information (BSSID) of the router 20 transmitted from the mobile terminal device 30 is different from the identification information (BSSID) of the communication repeater transmitted to the server 50 by the mobile terminal device 30 during the pairing.

However, when a plurality of users such as family members use the hot water supply device 10, a plurality of mobile terminal devices 30 respectively possessed by each user are paired with the hot water supply device 10. Therefore, if the sub repeater ID is registered during pairing by the plurality of mobile terminal devices 30, the identification information (BSSID) of the communication repeater installed inside the house H10 is sequentially registered as the sub repeater ID in the database of the server 50.

Therefore, as described above, even when the frequency bands (2.4 GHz and 5 GHz) at which the same mobile terminal device 30 is connected or the communication repeaters to which the same mobile terminal device 30 is connected at the time of the remote control and the pairing are different, the identification information (BSSID) of the communication repeater transmitted from the terminal device 30 to the server 50 at the time of the remote control matches any of sub repeaters managed by the server 50. Thus, the server 50 can appropriately determine whether the mobile terminal device 30 is inside the house H10 or outside the house based on the identification information (BSSID) of the communication repeater included in the connection request received from the mobile terminal device 30.

If the determination in step S202 is YES, the control portion 501 sets the remote operation mode to the in-house mode (S203). If the determination in step S202 is NO, the control portion 501 sets the remote operation mode to the out-of-house mode (S204). Then, the control portion 501 transmits a response including the set mode (mode information) and state information of the hot water supply device 10 to the mobile terminal device 30 (S205).

This response is received by the control portion 303 of the mobile terminal device 30 in step S102 of FIG. 6a. Thereafter, the server 50 executes processing for accepting a setting command from the mobile terminal device 30 (S206).

With reference to FIG. 6a, on receiving the response from the server 50 (S102: YES), the control portion 303 of the mobile terminal device 30 refers to the mode (in-house mode/out-of-house mode) included in the response and determines setting items which can be selected during the remote operation in accordance with the mode (S103). Here, setting items which can be selected in the in-house mode and setting items which can be selected in the out-of-house mode are stored in the storage portion 304 of the mobile terminal device 30 in advance. The control portion 303 selects, among these two setting item groups stored in the storage portion 304, the setting item group corresponding to the mode included in the response received from the server 50 as the setting item group which can be selected during the remote operation.

Here, the set item groups which can be selected in the in-house mode are all the items associated with all the functions which can be executed inside the house H10 in which the hot water supply device 10 is installed. In addition, the setting item groups which can be selected in the out-of-house mode are the rest items when part of items is excluded from all the items associated with all the functions which can be executed inside the house H10 in which the hot water supply device 10 is installed. Therefore, the number of the setting item groups in the in-house mode is greater than the number of the setting item groups in the out-of-house mode.

Furthermore, the items excluded in the out-of-house mode are adjusted to items, such as change of a hot water temperature, change of a bath temperature, change of a bath water level, or the like, which are assumed that unexpected change of setting is not preferable when functions of the hot water supply device 10 corresponding to these setting items are already used or to be used inside the house H10.

After determining the setting item groups which can be selected in this way, the control portion 303 displays an operation screen for accepting the remote operation on the display portion 301 and accepts a setting operation of the remote operation (S104). This operation screen is configured so that settings for the selectable setting item groups determined in step S103 are accepted and settings for other items are not accepted. That is, in the in-house mode, the operation screen is configured so that settings for all the items are accepted, and in the out-of-house mode, the operation screen is configured so that settings for the items excluding part of the items are accepted.

Figures 7A, 7B:
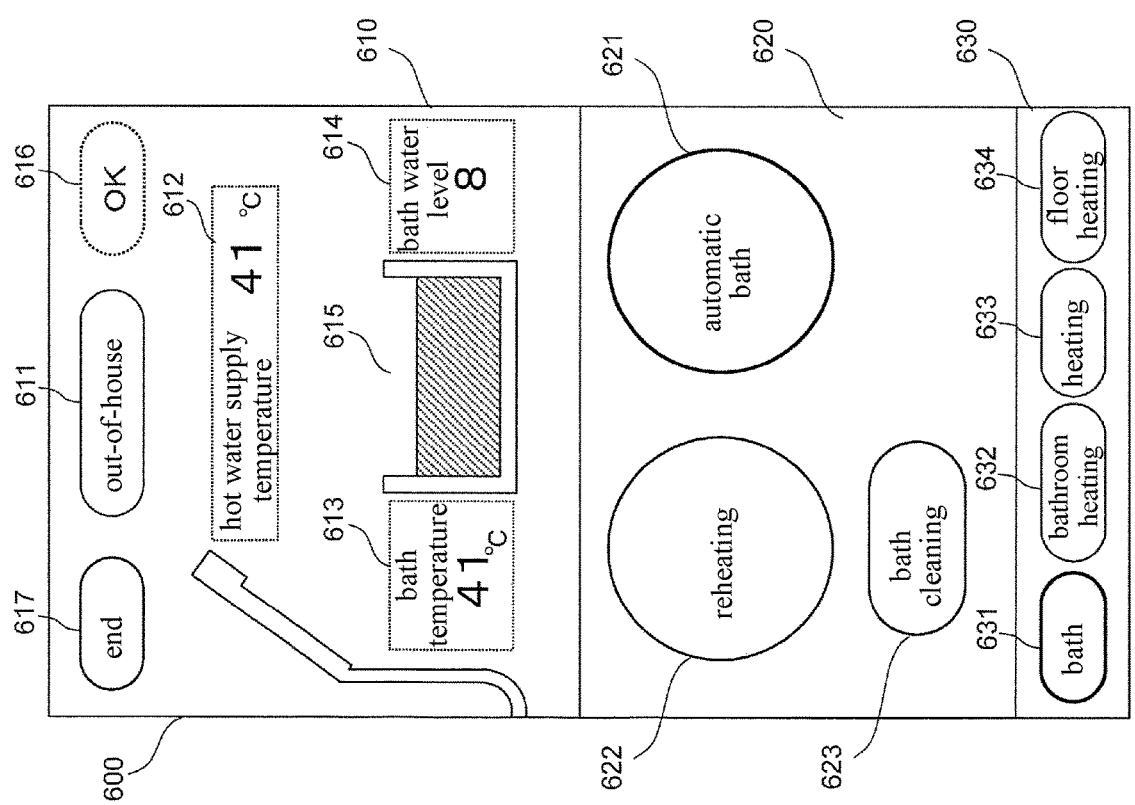
FIG. 7a is a diagram schematically showing an operation screen according to the embodiment which is displayed on the mobile terminal device at the time of the remote operation.
FIG. 7b is a diagram showing items according to the embodiment which can be remotely operated in an in-home mode and an out-of-home mode.

FIG. 7*a* is a diagram schematically showing an operation screen 600 displayed on the mobile terminal device 30 at the time of the remote operation. FIG. 7*b* is a diagram showing an example of the setting items which can be remotely operated in the in-house mode and the out-of-house mode.

In the example of FIG. 7*b*, in addition to the hot water supply function and the bath function, the floor heating function, the bathroom heating function, and the heating function can be executed inside the house H10 in which the hot water supply device 10 is installed. In the in-house mode, all the items associated with these functions can be set, and in the out-of-house mode, the rest items excluding items of temperature change in the functions of hot water supply, bathing, floor heating, bathroom heating, and heating and the item of water change in the bathing function from all the items associated with these functions can be set.

With reference to FIG. 7*a*, the operation screen 600 is divided into regions 610, 620, and 630.

The region 610 includes a mode display portion 611, a hot water supply temperature setting portion 612, a bath temperature setting portion 613, a bath water level setting portion 614, a bathtub image 615, a confirmation button 616, and an end button 617. Whether the current operation mode is the in-house mode or the out-of-house mode is displayed on the mode display portion 611 based on the mode information included in the response received in step S102 of FIG. 6*a*.

In addition, in the hot water supply temperature setting portion 612, the bath temperature setting portion 613, and the bath water level setting portion 614, setting states of current hot water supply temperature, bath temperature and bath water level are respectively shown based on the state information included in the response received in step S102 of FIG. 6*a*. In the bathtub image 615, the setting state of the current bath water level is displayed as an image of water remaining in the bathtub.

Here, when the operation mode is the in-house mode, the hot water supply temperature setting portion 612, the bath temperature setting portion 613, and the bath water level setting portion 614 are validated to an operable state. In this case, the confirmation button 616 is similarly validated. The operator can change the hot water supply temperature, the bath temperature, and the bath water level by touching the hot water supply temperature setting portion 612, the bath temperature setting portion 613, and the bath water level setting portion 614.

For example, when the operator touches these setting portions, an up/down key is displayed immediately below. Each time the operator touches the up/down key, a value in each setting portion increases/decreases. Thereby, the operator can change a set value for a desired setting portion. Thereafter, when the operator touches the confirmation button 616, the change of these items is confirmed.

When the operation mode is the out-of-house mode, the hot water supply temperature setting portion 612, the bath temperature setting portion 613, and the bath water level setting portion 614 are invalidated to an inoperable state. In this case, the confirmation button 616 is similarly invalidated. In FIG. 7*a*, since the operation mode is the out-of-house mode, the hot water supply temperature setting portion 612, the bath temperature setting portion 613, the bath water level setting portion 614, and the confirmation button 616 are all invalidated. In this case, even if the operator touches the hot water supply temperature setting portion 612, the bath temperature setting portion 613 and the bath water level setting portion 614, the hot water supply temperature, the bath temperature and the bath water level cannot be changed.

The region 620 includes a bath automatic setting portion 621, a reheating setting portion 622, and a bath cleaning setting portion 623. The bath automatic setting portion 621 is a setting button for remaining hot water in the bathtub at the bath temperature and the bath water level that are set. The reheating setting portion 622 is a setting button for setting reheating of the bath. The bath cleaning setting portion 623 is a setting button for performing bath cleaning automatically.

The bath automatic setting portion 621, the reheating setting portion 622, and the bath cleaning setting portion 623 are always validated to an operable state according to the conditions in FIG. 7*b* regardless of whether the operation mode is the in-house mode or the out-of-house mode.

The operator can select functions of these setting portions by touching the bath automatic setting portion 621, the reheating setting portion 622, and the bath cleaning setting portion 623. When these setting portions are touched again, the selection is released. The selected setting portions are highlighted in a manner that the selection of these setting portions can be visually recognized. In the example of FIG. 7*a*, the bath automatic setting portion 621 is selected.

Thereafter, the operator can confirm the selected setting items by touching the confirmation button 616.

The region 630 includes four buttons 631 to 634 for switching the functions being operation targets. In the example of FIG. 7a, the button 631 for setting the bath function as the operation target is selected. Thus, in the regions 610 and 620, the setting items corresponding to the bath function are displayed as operation targets.

When the operator touches the button 632, the setting items corresponding to the bathroom heating function are displayed in the regions 610 and 620 as operation targets. In addition, when the operator touches the button 633, the setting items corresponding to the heating function are displayed as operation targets in the regions 610 and 620, and when the operator touches the button 634, the setting items corresponding to the floor heating function are displayed as operation targets in the regions 610 and 620. Also in these cases, according to the conditions of FIG. 7b, when the operation mode is the out-of-house mode, only the setting items corresponding to the temperature change are invalidated, and when the operation mode is the in-house mode, all the setting items are validated.

When the confirmation button 616 is touched after the above operation is performed, the control portion 303 transmits a setting command corresponding to the items operated by the operator to the server 50 in step S104 of FIG. 6a. In response to this, the control portion 501 of the server 50 transmits a setting request including the received setting command to the control portion 133 of the kitchen remote controller 13 in step S206 of FIG. 6b. In this way, the setting according to the remote operation is performed on the hot water supply device 10.

When the remote operation is ended, the operator touches the end button 617 on the operation screen 600 in FIG. 7a. Thereby, the control portion 303 sets the determination in step S105 of FIG. 6a to YES, and transmits an end notification to the server 50 (S106). At the same time, the operation screen 600 in FIG. 7a is closed. Thereby, remote operation control in the mobile terminal device 30 is ended. On receiving the end notification from the mobile terminal device 30 (S207: YES), the control portion 501 of the server 50 ends the remote operation control. Thereby, control of the remote operation in the hot water supply system 1 is ended.

Effects of Embodiment

According to the embodiment, the following effects can be achieved.

As shown in FIG. 6b, when communication of the remote operation (connection request) for the hot water supply device 10 is received from the mobile terminal device 30 (S201: YES), the server 50 can determine whether the mobile terminal device 30 is inside or outside the house according to whether the identification information (BSSID) of the communication repeater received from the mobile terminal device 30 in this communication matches the identification information (the sub repeater ID) of the communication repeater stored in the storage portion 502. Therefore, control for determining remote control conditions in the server 50 (in-house mode/out-of-house mode setting) is performed based on these two pieces of identification information (BSSID), and thereby the hot water supply device 10 can be appropriately remotely controlled from inside the house H10 and outside the house.

In steps S202 and S203 of FIG. 6b, based on whether any sub repeater ID stored in the storage portion 502 in association with the hot water supply device 10 being the remote control destination matches the identification information (BSSID) of the communication repeater received from the mobile terminal device 30 in the connection request of the remote control, either the in-house mode or the out-of-house mode is determined. In this way, even when the frequency bands (2.4 GHz and 5 GHz) at which the mobile terminal device 30 is connected or the communication repeaters to which the mobile terminal device 30 is connected are different at the time of the remote control and the pairing, as described above, whether the mobile terminal device 30 is inside the house H10 or outside the house can be appropriately determined in the server 50. Therefore, the hot water supply device 10 can be remotely controlled more appropriately from inside the house H10 and outside the house.

As shown in FIG. 7b, the target items of the remote operation in the case of in-house mode are adjusted to be more than the target items of the remote operation in the case of out-of-house mode. In this way, by limiting the target items in the remote operation from outside the house, it is possible to avoid giving a noticeable discomfort or inconvenience to the user inside the house H10. Therefore, more appropriate remote control can be achieved.

Modification Example

In the above embodiment, when the mobile terminal device 30 is outside the house, the setting items which can be operated are limited on the operation screen 600 of the mobile terminal device 30, but in the modification example, all the setting items are set to be operable in the mobile terminal device 30 regardless of whether the mobile terminal device 30 is outside the house or inside the house H10. That is, in the modification example, the operation screen 600 is not changed between the in-house mode and the out-of-house mode. Instead, in this modification example, whether the setting command received from the mobile terminal device 30 is a setting command which can be permitted by the operation mode (in-house mode/out-of-house mode) is determined in the server 50, and when the setting command is not permitted, the server 50 refuses to accept the setting command.

Figure 8B:
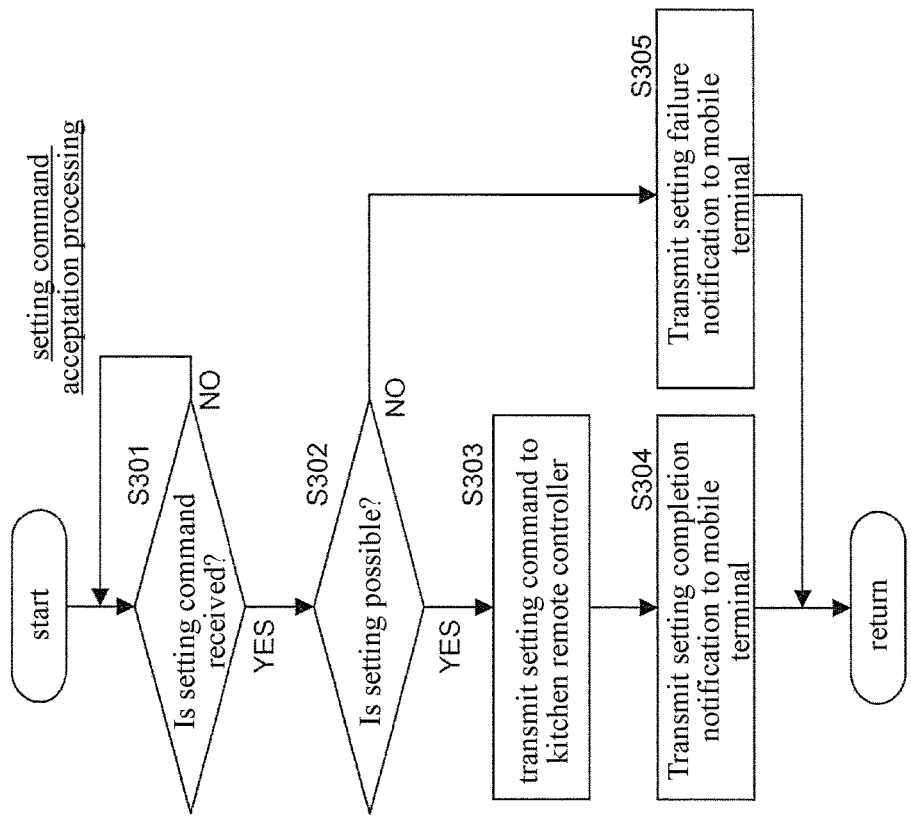
FIG. 8b is a flowchart showing a set command acceptation processing of the server according to the modification example.
Figure 8A:
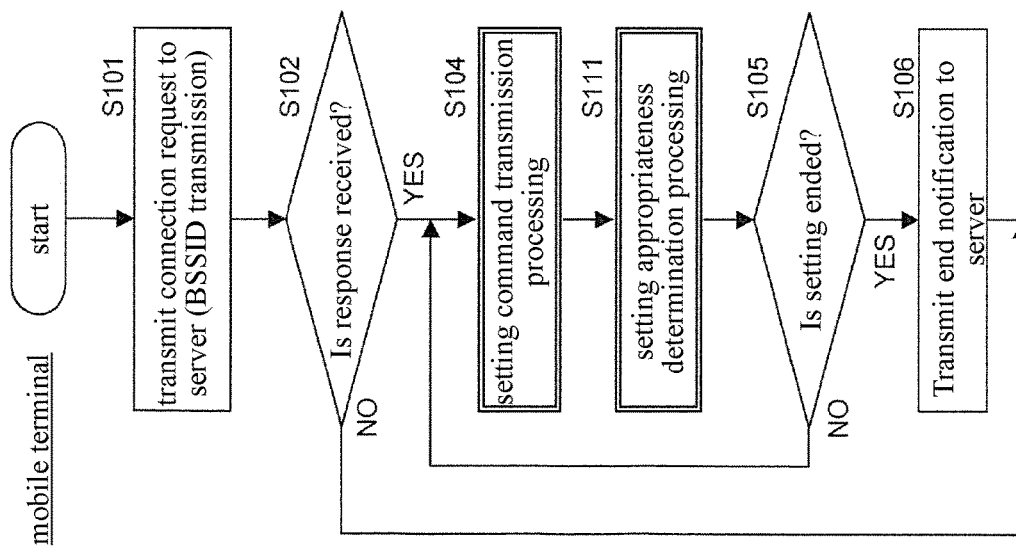
FIG. 8a is a flowchart showing the control of the mobile terminal device in the remote operation according to a modification example.
Figure 9B:
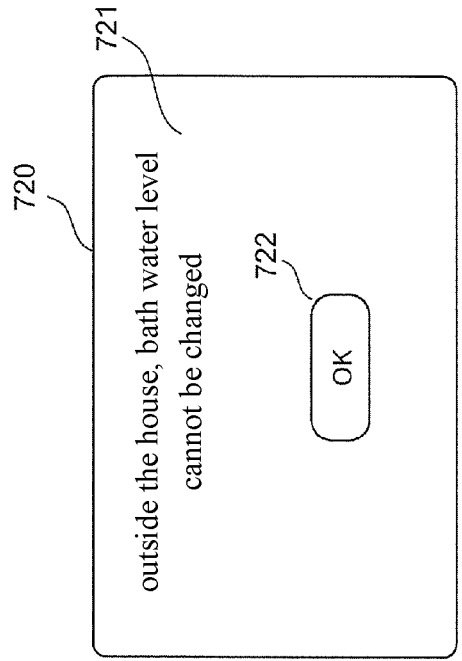
FIGS. 9a-9d are diagrams respectively showing an example of a notification screen according to a modification example which is displayed when an item which cannot be set is operated.
Figure 9D:
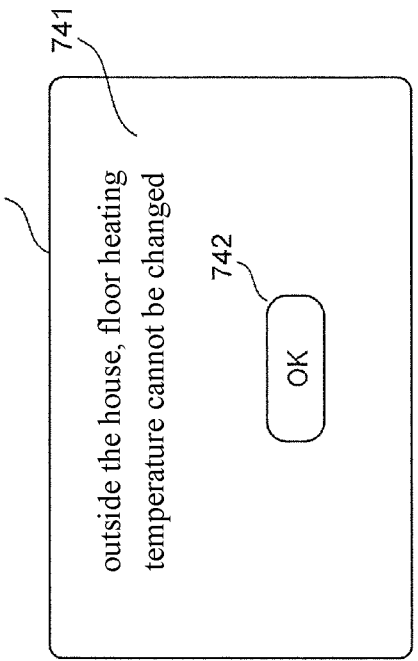
Figure 9A:
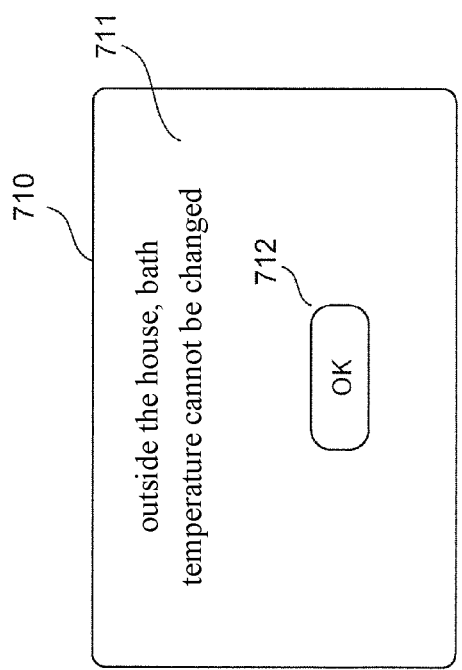
Figure 9C:
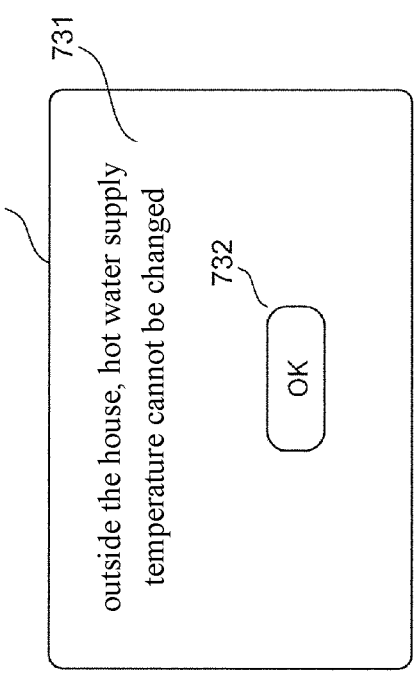

In this case, the control in the mobile terminal device 30 is changed as shown in FIG. 8a. In the control of FIG. 8a, step S103 of FIG. 6a is omitted, and step S111 is added. By omitting step S103, the operation screen 600 displayed in step S104 is set in a manner that all the setting items can be operated regardless of the operation mode (in-house mode/out-of-house mode). For example, the hot water supply temperature setting portion 612, the bath temperature setting portion 613, the bath water level setting portion 614 and the confirm button 616 shown in FIG. 7a can all be validated to be operable regardless of the operation mode (in-house mode/out-of-house mode).

In addition, in this case, the setting command acceptance processing in step S206 of FIG. 6b is executed according to the flowchart shown in FIG. 8b. That is, on receiving a setting command from the mobile terminal device 30 (S301: YES), the control portion 501 of the server 50 determines whether the received setting command is a setting command which can be permitted by the operation mode set in steps S203 and S204 in FIG. 7b (S302).

For example, when the operation mode is the out-of-house mode, on receiving a setting command related to hot water supply temperature change, the control mode 501 determines NO in step S302. When the operation mode is the in-house mode, the control portion 501 determines YES in step S302 for any setting command.

When the determination in step S302 is YES, the control portion 501 of the server 50 transmits a setting request including the received setting command to the control portion 133 of the kitchen remote controller 13 (S303). In this way, the setting according to the remote operation is performed on the hot water supply device 10. Furthermore, the control portion 501 transmits, to the mobile terminal device 30, a notification indicating that the setting by the remote operation has been completed for the hot water supply device 10 (S304). In this way, the setting command acceptation processing is ended.

When the determination in step S302 is NO, the control portion 501 of the server 50 does not transmit the setting request including the received setting command to the control portion 133 of the kitchen remote controller 13 and transmits a notification indicating that the setting command is not accepted to the mobile terminal device 30 (S305). In this case, the setting according to the remote operation is not performed on the hot water supply device 10. Thus, the setting command acceptation processing is ended.

The control portion 303 of the mobile terminal device 30 determines whether the setting command is accepted by the server 50 based on the notification transmitted in steps S304 and S305 (S111). When the setting command is accepted, the control portion 303 advances the processing to step S105. On the other hand, when the setting command is not accepted, the control portion 303 displays, on the display portion 301, a notification screen for notifying that the setting command is not accepted.

FIGS. 9a-9d are diagrams respectively showing an example of the notification screen.

FIGS. 9a-9d respectively show notification screens 710 to 740 when a bath temperature changing operation, a bath water level changing operation, a hot water supply temperature changing operation, and a floor heating temperature changing operation are performed in the out-of-house mode. The notification screens 710 to 740 respectively include notification sentences 711 to 741 indicating that these change operations cannot be performed outside the house, and OK buttons 712 to 742. The operator grasps that these operations are not accepted from outside the house with reference to the notification sentences 711 to 741. Thereafter, the operator touches the OK buttons 712 to 742. Thereby, the control portion 303 advances the processing to step S105. Furthermore, when the bathroom heating temperature changing operation and the heating temperature changing operation are performed, a similar notification screen is also displayed.

In the modification example, the same effects as in the above embodiment can also be achieved.

Other Modification Examples

In the above embodiment, the BSSID of the communication repeater is used as the sub repeater ID, but other identification information unique to the communication repeater may also be used as the sub repeater ID. The same applies to the main repeater ID.

In addition, in the above embodiment, the items which can be remotely operated in the in-house mode and the out-of-house mode are changed; however, it may be that items which can be remotely monitored in the in-house mode and the out-of-house mode are changed. For example, the number of the items which can be remotely monitored in the in-house mode may be adjusted to be greater than the number of the items which can be remotely monitored in the out-of-house mode. Thereby, the security of the user of hot water supply device 10 can be ensured more appropriately.

In addition, in the above embodiment, the identification information (BSSID) of the communication repeater to which the mobile terminal device 30 is connected is registered in the server as the sub repeater ID during the pairing processing; however, when the identification information (BSSID) of the communication repeater to which the kitchen remote controller 13 is connected is registered in the server 50 as the main repeater ID during the initial operation between the kitchen remote controller 13 and the server 50, the identification information (BSSID) may be further registered in the server 50 as the sub repeater ID. Thereby, the number of the registration of the sub repeater IDs can be increased more quickly, and the in-house/out-of-house determination of the mobile terminal device 30 can be easily and more appropriately performed.

In addition, in the above embodiment, the wireless communication portion 136 is arranged in the kitchen remote controller 13 which configures the hot water supply device 10; however, the wireless communication portion may be arranged in the water heater 11 and the water heater 11 is connected to the router 20. In this case, the control of the kitchen remote controller 13 in the above embodiment is performed by the control portion 111 of the water heater 11. Alternatively, in addition to the water heater 11, the bathroom remote controller 12, and the kitchen remote controller 13, a control unit having a wireless communication portion may be arranged in the hot water supply device 10, and this control unit is connected to the router 20. In this case, the control by the kitchen remote controller 13 in the above embodiment is performed by the control unit.

In addition, in the above embodiment, the pairing notification request is transmitted from the control portion 303 of the mobile terminal device 30 to the server 50; however, the pairing notification request may be transmitted from the hot water supply device 10 (the control portion 133 of the kitchen remote controller 13 in the above embodiment) to the server 50.

Furthermore, the terminal device which remotely controls the hot water supply device 10 may include a stationary terminal device which is not portable and is installed at a predetermined location.

Additionally, the embodiment of the disclosure can be variously modified appropriately within the scope of claims.

What is claimed is:

1. A hot water supply system, comprising:
a hot water supply device which can be connected to an external communication network via a communication repeater; and
a server which is connected to the external communication network and controls the hot water supply device based on a request from a mobile terminal device;
wherein the server
obtains, in pairing processing of associating the mobile terminal device which remotely controls the hot water supply device with the hot water supply device, identification information of the communication repeater to which the mobile terminal device is connected, and stores the identification information in a storage portion along with pairing information, and
performs control to determine conditions of the remote control based on whether the identification information of the communication repeater stored in the storage portion in association with the hot water supply device being a remote control destination matches identification information of a communication repeater received from the mobile terminal device in the communication, when the communication of the remote control to the hot water supply device is received from the mobile terminal device.

2. The hot water supply system according to claim 1, wherein the server
stores, when identification information of the communication repeater different from each other is obtained in the pairing processing for a plurality of the mobile terminal devices, these identification information in the storage portion; and
performs the control to determine the conditions of the remote control based on whether any identification information of the communication repeater stored in the storage portion in association with the hot water supply device being the remote control destination matches the identification information of the communication repeater received from the mobile terminal devices in the communication, when the communication of the remote control to the hot water supply device is received from the mobile terminal devices.

3. The hot water supply system according to claim 1, wherein
the server performs the control for the mobile terminal device in a manner that there are more target items of remote operation when the two pieces of identification information being comparison targets match each other than target items of the remote operation when the two pieces of identification information do not match.

4. The hot water supply system according to claim 2, wherein
the server performs the control for the mobile terminal device in a manner that there are more target items of remote operation when the two pieces of identification information being comparison targets match each other than target items of the remote operation when the two pieces of identification information do not match.

5. The hot water supply system according to claim 1, wherein
the identification information of the communication repeater is a BSSID.

6. The hot water supply system according to claim 2, wherein
the identification information of the communication repeater is a BSSID.

7. The hot water supply system according to claim 3, wherein
the identification information of the communication repeater is a BSSID.

8. The hot water supply system according to claim 4, wherein
the identification information of the communication repeater is a BSSID.

9. A server which controls, based on a request from a mobile terminal device, a hot water supply device which is connected to an external communication network via a communication repeater, the server comprising
a storage portion and a control portion;
wherein the control portion
obtains, in pairing processing of associating the mobile terminal device which remotely controls the hot water supply device with the hot water supply device, identification information of a communication repeater to which the mobile terminal device is connected, and stores the identification information in the storage portion along with pairing information, and
performs control to determine conditions of the remote control based on whether the identification information of the communication repeater stored in the storage portion in association with the hot water supply device being a remote control destination matches identification information of a communication repeater received from the mobile terminal device in the communication, when the communication of the remote control to the hot water supply device is received from the mobile terminal device.

10. The server according to claim 9, wherein the control portion
stores, when identification information of the communication repeater different from each other is obtained in the pairing processing for a plurality of the mobile terminal devices, these identification information in the storage portion; and
performs the control to determine the conditions of the remote control based on whether any identification information of the communication repeater stored in the storage portion in association with the hot water supply device being the remote control destination matches the identification information of the communication repeater received from the mobile terminal devices in the communication, when the communication of the remote control to the hot water supply device is received from the mobile terminal devices.

11. The server according to claim 9, wherein
the control portion performs the control for the mobile terminal device in a manner that there are more target items of remote operation when the two pieces of identification information being comparison targets match each other than target items of the remote operation when the two pieces of identification information do not match.

12. The server according to claim 10, wherein
the control portion performs the control for the mobile terminal device in a manner that there are more target items of remote operation when the two pieces of identification information being comparison targets match each other than target items of the remote operation when the two pieces of identification information do not match.

13. The server according to claim 9, wherein
the identification information of the communication repeater is a BSSID.

14. The server according to claim 10, wherein
the identification information of the communication repeater is a BSSID.

15. The server according to claim 11, wherein
the identification information of the communication repeater is a BSSID.

16. The server according to claim 12, wherein
the identification information of the communication repeater is a BSSID.

17. A non-transitory computer readable recording medium storing a program which makes a control portion of a mobile terminal device execute a function for remotely controlling a hot water supply device, wherein the program comprises:
in a pairing processing of associating the mobile terminal device with the hot water supply device, processing of transmitting, via an external communication network to a server which manages the remote control, identification information of a communication repeater to which the mobile terminal device is connected.

* * * * *